(12) United States Patent
Krueger

(10) Patent No.: US 10,550,956 B2
(45) Date of Patent: *Feb. 4, 2020

(54) LOCKING/ INDEXING PIN

(71) Applicant: BNSF Railway Company, Fort Worth, TX (US)

(72) Inventor: Darrell Robert Krueger, Lawrence, KS (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,380

(22) Filed: Aug. 24, 2018

(65) Prior Publication Data

US 2018/0363800 A1    Dec. 20, 2018

Related U.S. Application Data

(63) Continuation of application No. 15/234,109, filed on Aug. 11, 2016, now Pat. No. 10,066,759.

(60) Provisional application No. 62/317,696, filed on Apr. 4, 2016.

(51) Int. Cl.
  *F16B 21/12*   (2006.01)
  *F16B 7/10*    (2006.01)
  *F16K 35/02*   (2006.01)

(52) U.S. Cl.
  CPC ........... *F16K 35/025* (2013.01); *F16B 21/12* (2013.01); *F16B 7/105* (2013.01); *Y10T 403/32483* (2015.01); *Y10T 403/32508* (2015.01); *Y10T 403/598* (2015.01); *Y10T 403/599* (2015.01); *Y10T 403/604* (2015.01)

(58) Field of Classification Search
  CPC ........ F16K 31/025; F16B 7/105; F16B 21/12; Y10T 403/32483; Y10T 403/32508; Y10T 403/598; Y10T 403/599; Y10T 403/604
  See application file for complete search history.

(56) References Cited

U.S. PATENT DOCUMENTS

| | | |
|---|---|---|
| 649,444 A | 5/1900 | Good |
| 1,714,196 A | 5/1929 | Vara |
| 2,909,212 A | 10/1959 | Scherer |
| 3,337,245 A | 8/1967 | Prange |
| 3,554,585 A * | 1/1971 | Sorenson ................. A63B 3/00 403/105 |
| 3,685,865 A | 8/1972 | Young |
| 4,021,126 A | 5/1977 | Deeter et al. |
| 4,113,221 A | 9/1978 | Wehner |
| 4,165,854 A | 8/1979 | Duly |
| 4,602,890 A | 7/1986 | Duda |
| 4,635,327 A | 1/1987 | Netznik |

(Continued)

*Primary Examiner* — Kevin F Murphy
*Assistant Examiner* — Jonathan J Waddy

(57) ABSTRACT

A locking pin assembly having a body including a wall defining an interior space and having at least one aperture therethrough for allowing fluid communication between the interior space and an exterior environment. A barrel defines a bore and has an outer wall with external threads. A pin travels longitudinally within the interior space of the body and the bore of the barrel. A spring actuated assembly maintains an end of the pin in an extended position relative to an end of the barrel when no force is applied to the pin and allows the pin to retract relative to the end of the barrel when a force is applied to the pin.

16 Claims, 3 Drawing Sheets

(56) References Cited

U.S. PATENT DOCUMENTS

| | | |
|---|---|---|
| 5,433,552 A | 7/1995 | Thyu |
| 6,155,441 A * | 12/2000 | Andersen ............. A47B 47/021 |
| | | 211/192 |
| 6,193,433 B1 | 2/2001 | Gutierrez et al. |
| 6,398,445 B1 | 6/2002 | Matali Badia |
| 6,595,379 B1 | 7/2003 | Powell |
| 6,679,393 B1 | 1/2004 | Weaver et al. |
| 7,198,306 B2 | 4/2007 | Ambs |
| 8,454,260 B2 | 6/2013 | Wilcoxson |
| 8,516,732 B2 | 8/2013 | Burnsed, Jr. |
| 8,821,061 B2 | 9/2014 | Baus |
| 10,066,759 B1 * | 9/2018 | Krueger ................ F16K 35/025 |
| 2003/0156923 A1 | 8/2003 | Winkler et al. |
| 2006/0079840 A1 | 4/2006 | Allard |
| 2007/0003365 A1 | 1/2007 | Walt, II et al. |

\* cited by examiner

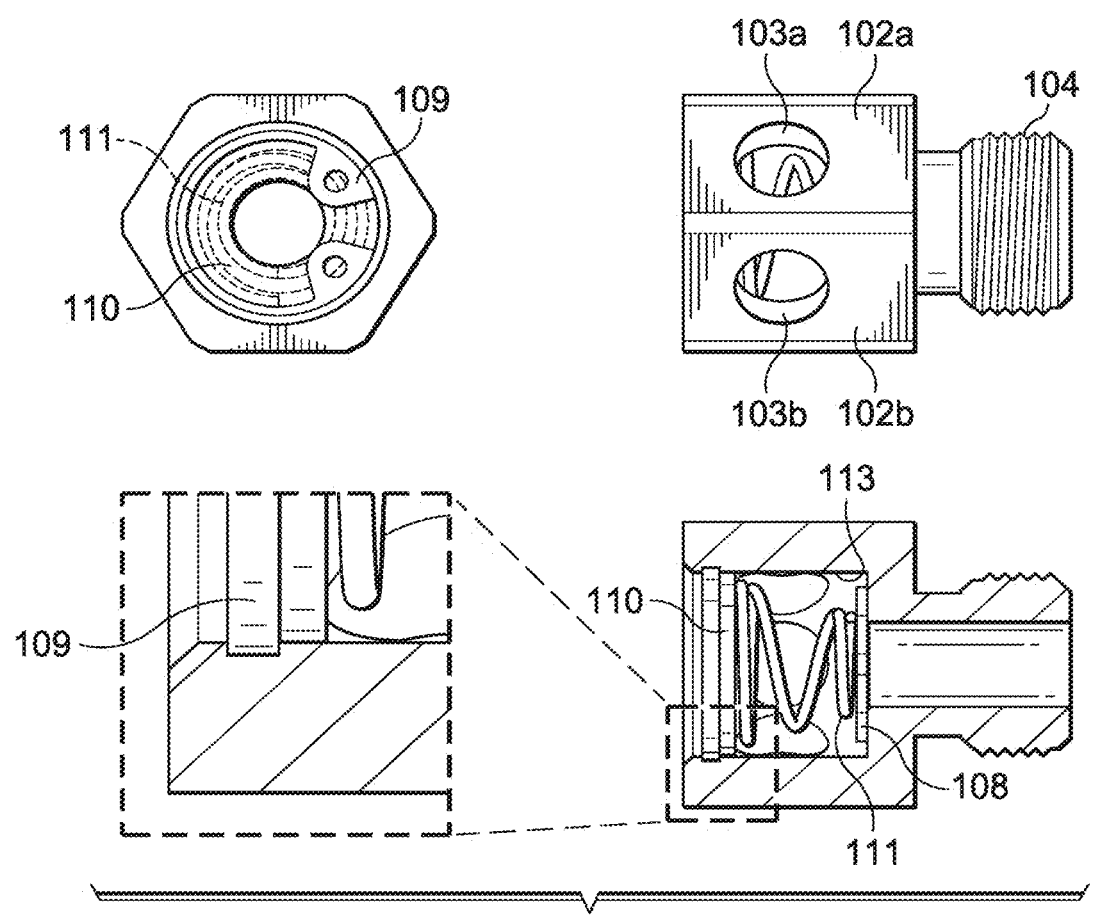
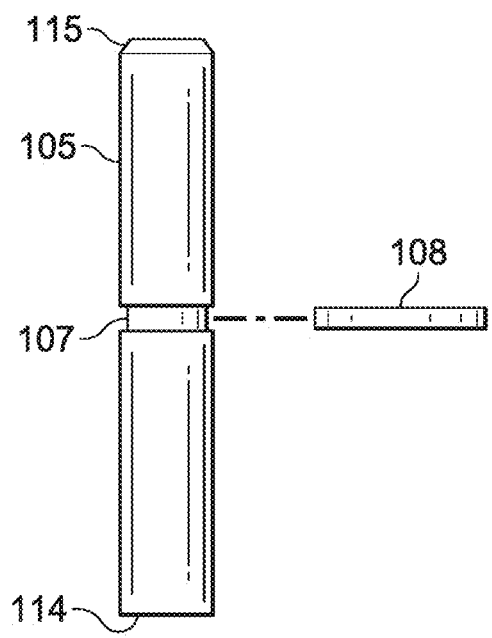
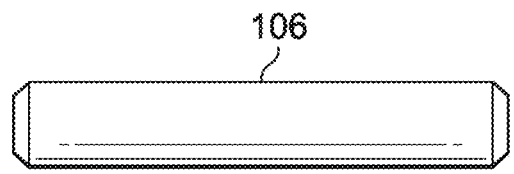
FIG. 1D
FIG. 1E          FIG. 1F

LOCKING/ INDEXING PIN

CROSS-REFERENCE TO RELATED APPLICATION

The present application is a continuation of application Ser. No. 15/234,109, filed Aug. 11, 2016, which claims the benefit of U.S. Provisional Patent Application Ser. No. 62/317,696, filed Apr. 4, 2016, which is incorporated herein by reference for all purposes.

FIELD OF INVENTION

The present invention relates in general to fluid connection locking/indexing pins.

BACKGROUND OF INVENTION

Existing commercially available spring-return, plunger-style locking/indexing pins suitable for use as fluid connection lock pins are subject to a number of significant disadvantages. Among other things, currently available spring-return, plunger-style locking/indexing pins are typically permanently sealed and hence not user serviceable. In addition, some of these locking/indexing pins use knob-style grips made of plastic, which are unable to withstand the rigors of some operating environments, such as those encountered during railroad service. Those commercially available locking/indexing pins that do use knob-style grips made from metal disadvantageously shroud the internal mechanism.

In addition, existing commercially available spring-return, plunger-style locking/indexing pins are prone to retaining rain water and other materials inside the locking pin body. In cold weather operations, retained water results in ice build-up and renders the locking/indexing pin inoperable. Furthermore, the closed design neither allows the operator see any ice build-up or other material accumulations to verify operation nor drainage from the device interior.

SUMMARY OF INVENTION

A field-serviceable, freely-draining, spring-return, plunger-style locking or indexing pin for all-weather and harsh environments. The primary intended use of these locking/indexing pins is on fluid connectors prone to loosening by vibration, although locking and indexing pins embodying the inventive principles are equally applicable to a number of other applications requiring a locking or indexing pin.

According one particular exemplary embodiment of the present inventive principles, a locking pin assembly is disclosed, which has a body including a wall defining an interior space and having at least one aperture therethrough for allowing fluid communication between the interior space and an exterior environment. A barrel defines a bore and has an outer wall with external threads. A pin travels longitudinally within the interior space of the body and the bore of the barrel. A spring actuated assembly maintains an end of the pin in an extended position relative to an end of the barrel when no force is applied to the pin and allows the pin to retract relative to the end of the barrel when a force is applied to the pin.

BRIEF DESCRIPTION OF DRAWINGS

For a more complete understanding of the present invention, and the advantages thereof, reference is now made to the following descriptions taken in conjunction with the accompanying drawings, in which:

FIG. 1D are a series of views showing in further detail the locking/indexing pin body of FIGS. 1A-1C;

FIG. 1E is an elevational side view showing in further detail the lock pin of FIGS. 1A and 1C;

FIG. 1F is a top plan view showing in further detail the handle of FIGS. 1A and 1C.

DETAILED DESCRIPTION OF THE INVENTION

Figure 1A:
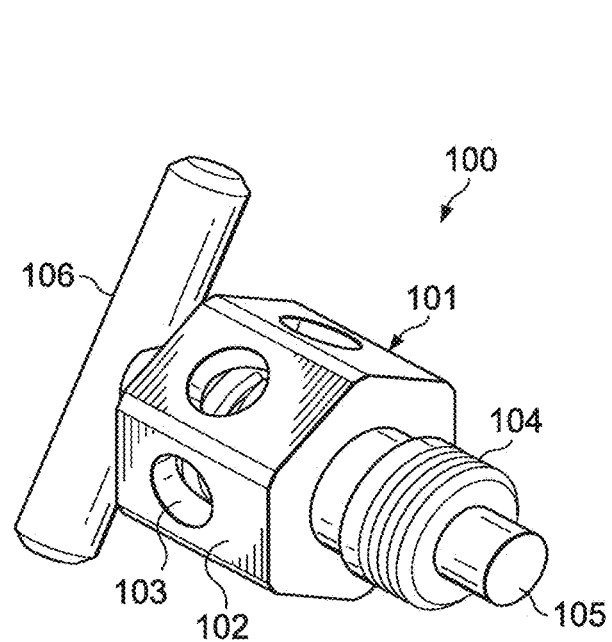
FIG. 1A is a perspective view of a locking/indexing pin embodying the principles of the present invention.
Figure 1B:
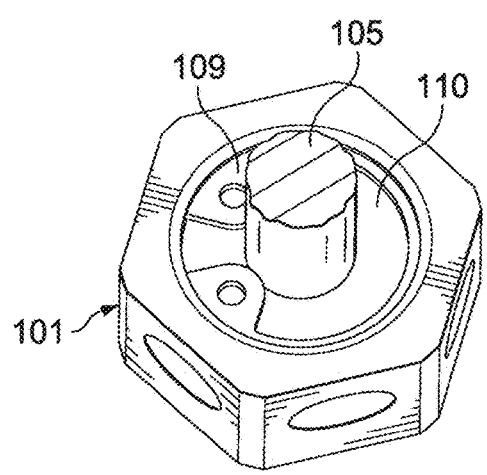
FIG. 1B is a top perspective view of the locking/indexing pin of FIG. 1A with the handle removed.
Figure 1C:
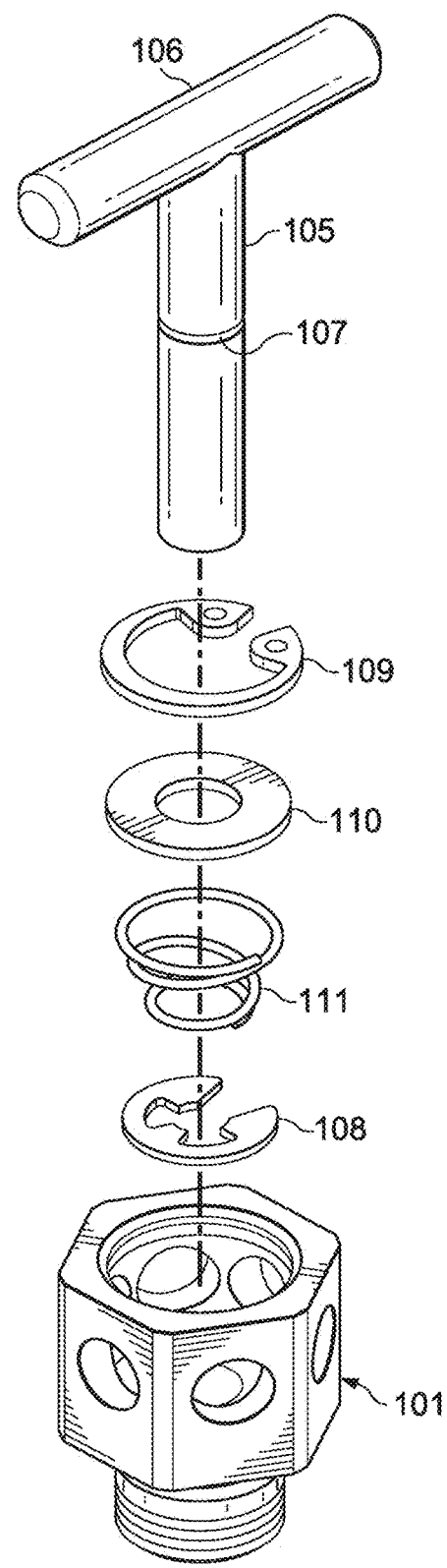
FIG. 1C is an exploded view of the locking/indexing pin of FIG. 1A.
Figure 2:
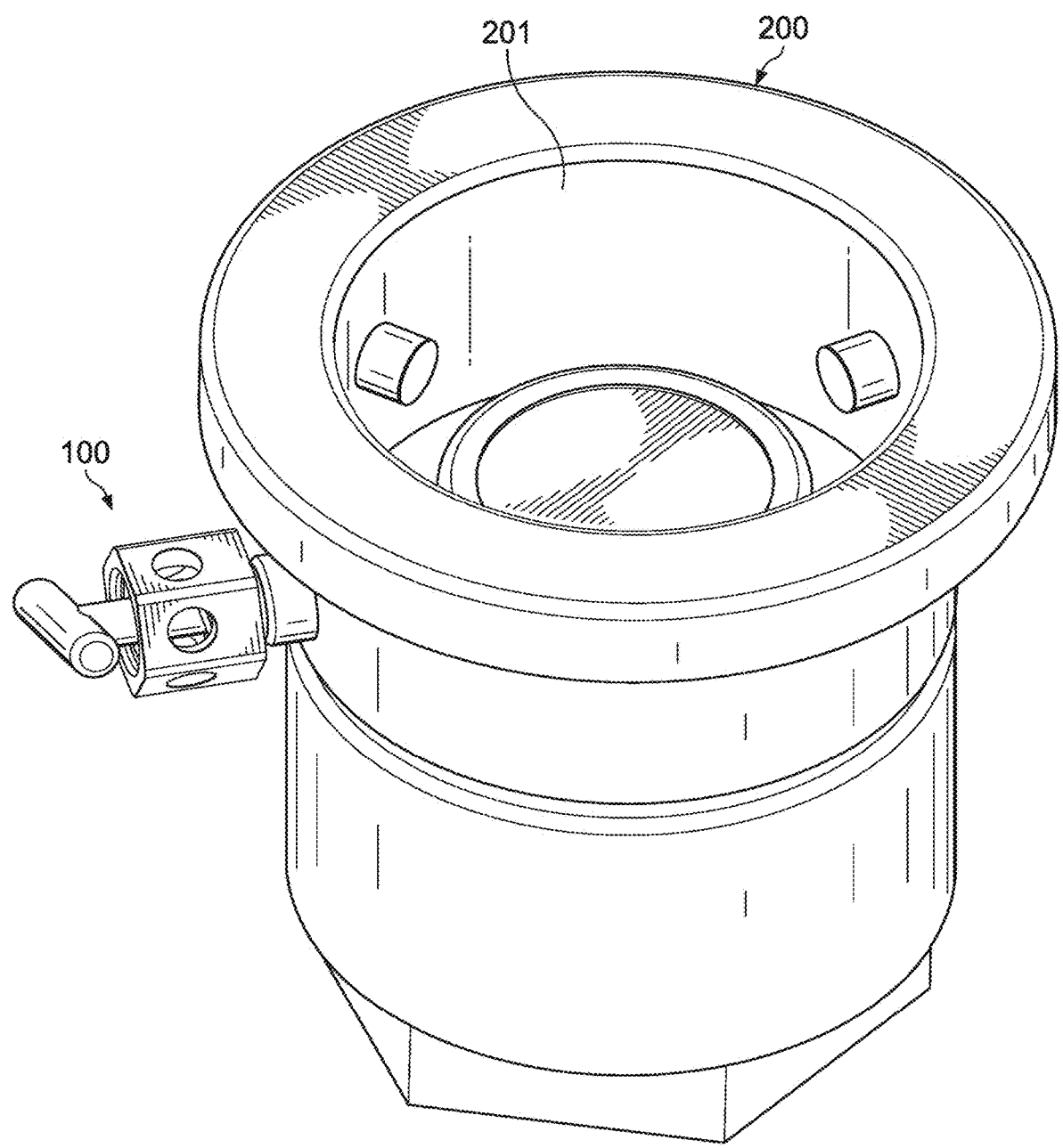
FIG. 2 is a perspective view showing a representative use of the locking/indexing pin of FIG. 1A in an assembly including the female portion of a fluid connector.

The principles of the present invention and their advantages are best understood by referring to the illustrated embodiment depicted in FIGS. 1-2 of the drawings, in which like numbers designate like parts.

FIG. 1A is a side perspective view of a locking/index pin 100 according to one embodiment of the present inventive principles. The components of locking/indexing pin 100 are preferably constructed of metal, such as brass or steel, or other material capable of withstanding harsh environments.

Locking/index pin 100 includes a body 101 having a plurality of sides 102. In the illustrated embodiment, body 101 has a hexagonal outer wall defined by six (6) sides 102, although in alternate embodiments the number of sides 102 may differ or the outer wall of body 101 may be smooth (e.g., circular or ovoid).

In the illustrated embodiment of locking/index pin 100, each side 102 of body 101 includes an aperture 103, which allows water and other materials to drain from locking pin body 101, as well as allows personnel to observe and/or service components within locking body 101. In alternate embodiments, some sides 102 may not include an aperture 103 (i.e., are solid).

A tubular barrel 104 with external threads extends from body 101. In some embodiments, body 101 and threaded barrel 104 are formed as two separate pieces and fastened together (e.g., by welding or brazing in embodiments in which body 101 and threaded barrel 104 are made of metal). In alternate embodiments, body 101 and threaded barrel 104 are formed as a single piece (e.g., by casting or molding). Furthermore, in alternate embodiments, barrel 104 need not be threaded. For example, barrel 104 may have a smooth outer surface and may be connected to an associated device (e.g., fluid connector) by welding or brazing.

The threads of threaded barrel 104 are adapted to be threaded into a tapped aperture in another structure, such the standard tapped aperture in the wall of a standard fluid connector, such as that shown in FIG. 2.

A lock pin 105, extends through the space defined within body 101 and the bore through threaded barrel 104. In FIG. 1A, lock pin 105 is shown in its normally extended position, with the engagement end (114, FIG. 1E) of lock pin 105 extending substantially beyond the end of threaded barrel 104. A handle or grip 106 allows lock pin 105 to be retracted (pulled) into threaded barrel 104. In the preferred embodiment, lock pin 105 and handle 106 are fabricated as separate metal pieces and are welded or brazed together, although alternate fastening techniques may be used, such as threading a threaded end of lock pin 105 into a tapped aperture in handle 106.

In alternate embodiments, lock pin 105 and handle 106 may be fabricated as a single piece, for example by casting.

FIG. 1B is a top perspective view of locking/index pin 100 with handle 106 removed for clarity. FIG. 1B shows the handle end of lock pin 105 extending through a washer 110 and a retaining clip 109, which are shown in further detail in the exploded view of FIG. 1C.

As shown in FIG. 1C, lock pin 105 extends through retaining ring 109, washer 110, conical spring 111, E-clip 108, and the bore of threaded barrel 104. E-clip 108 engages a slot 107 on lock pin 105 and is disposed between the narrower end of conical spring 111 and the lower interior sidewall of body 101. Washer 110 and retaining ring 109 retain the wider end of conical spring 111 within the interior of body 101.

As shown in FIG. 1D, one side of washer 110 contacts the wider end of conical spring 111, which is visible through apertures 103a and 103b in sides 102a and 102b, respectively. The peripheral edge of washer 110 engages the circular inner sidewall 113 of body 101. Retaining ring 109 contacts the opposing side of washer 110 and engages with upper inner sidewall 113 to hold washer 110 in place. For clarity, E-clip 108 is shown in FIG. 1D apart from lock pin 105, but in its location when lock pin 105 is in the extended position shown in FIG. 1A.

FIG. 1E shows lock pin 105, including slot 107, in further detail. The engagement end 114 of lock pin is preferably square and the opposing handle end 115 of locking pin 105 is preferably chamfered. FIG. 1F illustrates one exemplary shape of handle 106, although other shapes may be used in alternate embodiments of locking/indexing pin 100.

When no force is applied to either handle 106 or engagement end 114 of lock pin 105, the force applied to E-clip 108 by conical spring 111 (see FIG. 1D) holds lock pin 105 in the extending position shown in FIG. 1A. Pulling on handle 106 or pushing on engagement end 114 of lock pin 105 counters the force applied by conical spring 111 and retracts locking pin 105 into the bore of threaded barrel 104.

Generally, locking/indexing pin 100 is suitable for use with connectors subject to loosening by vibration, such as the fluid connectors used in harsh environments such as those encountered during railroad service. A particular representative use of locking/index pin 100 is with hose (female) unit 200 shown in FIG. 2, which is the locking connector in a conventional fluid connector assembly, which also includes a tank (male) unit (not shown). In FIG. 2, the threads of threaded barrel 104 have engaged a corresponding tapped aperture on the sidewall of female connector 200.

Engagement end 114 of lock pin 105 engages a conventional structure internal to hose unit 200 (not shown). When hose unit 200 is disconnected, this internal structure provides restraint against lock pin engagement end 114 and conical spring 111 to hold lock pin 105 radially in the retracted position, while still allowing for full circumferential movement of receptacle 201.

For connection, hose unit 200 engages the tank unit axially until a stop is reached. Receptacle 201 is then rotated clockwise, and three cam rollers engage a circumferential slot on the tank unit, securing the relative axial position of hose unit 200 to the tank unit. Receptacle 201 is further rotated, and the internal mechanisms of hose unit 200 extend a poppet into the tank unit, opening the fluid connection. In the final degrees of rotational motion of receptacle 201, engagement end 114 of lock pin 105 is forced into a recess in the internal structure hose unit 200 by conical spring 111. When engagement end 114 of lock pin 105 is properly engaged in the recess, rotation of hose unit 200 relative to the tank unit is prevented, which thus prevents disconnection of the hose and tank unit.

To disconnect, engagement end 114 of lock pin 105 is retracted by the user by pulling handle 106, in a radial direction relative hose unit 200, against the force applied by spring 111. While lock pin 105 is held in a retracted position, receptacle 201 is rotated relative to the tank unit until lock pin 105 is clear of the internal recess. Upon clearing the recess, lock pin 105 may be released by the user and receptacle 201 may continue to be rotated to fully disengage hose unit 200 from the tank unit.

In addition to fluid connectors, locking/indexing pin 100 is also suitable for use with any equipment requiring indexing pins or locking pins subjected to all—weather or harsh environments, such as welding or machining jigs and fixtures, temporary folding structures such as scaffolding and shelters, securement of telescoping arms, dividing heads, among others.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. An apparatus, comprising:
a body having an axis and including a plurality of walls defining an interior space, each of the walls has an aperture that is unobstructed and extends radially through the respective wall relative to the axis for allowing fluid communication between the interior space and an exterior environment, and a barrel extending from the body and configured to be mounted to an object, the barrel having a bore in communication with the interior space of the body;
a sub-assembly configured to be removably attached to the body while the body is mounted to the object, the sub-assembly comprising:
a pin operable to travel longitudinally within the interior space of the body and the bore of the barrel;
a handle mounted to a handle end of the pin;
a retainer removably disposed on the pin adjacent the handle;
a clip removably mounted to a slot in the pin away from the handle; and
a spring disposed on the pin between the retainer and the clip, wherein the spring is configured to:
maintain an engagement end of the pin in an extended position beyond an end of the barrel when no actuating force is applied to the pin, and allow the engagement end of the pin to retract into the bore of the barrel when an actuating force is applied to at least one of the handle or the engagement end of the pin.

2. The apparatus of claim 1, wherein the sub-assembly is configured to be retained in the body via engagement between the retainer and the body, and release of the retainer releases the sub-assembly from the body.

3. The apparatus of claim 2, wherein the retainer comprises ears that are accessible from an exterior of the body even when the handle is on the pin.

4. The apparatus of claim 3, wherein the ears have holes that are configured to be engaged by a tool to release the retainer from the body.

5. The apparatus of claim 3, wherein the handle comprises a rod that is configured to permit unobstructed access to the ears when the sub-assembly is mounted to the body.

6. The apparatus of claim 1, wherein the body and the barrel comprise separately fabricated pieces fastened together.

7. The apparatus of claim 1, wherein the body and the barrel are fabricated by metal fastened together by welding or brazing.

8. The apparatus of claim 1, wherein the body and barrel compose a single integrally fabricated piece.

9. The apparatus of claim 1, wherein the pin and the handle comprise separately fabricated metal pieces fastened together by welding or brazing, and the handle comprises a cylindrical rod that is transverse to the pin.

10. The apparatus of claim 1, wherein the barrel comprises a threaded outer wall and a smooth neck between the interior space and the threaded outer wall.

11. The apparatus of claim 1, wherein the walls of the body define a polygonal outer shape for an entirety of the body.

12. The apparatus of claim 1, wherein the spring comprises a conical spring.

13. The apparatus of claim 1, wherein the clip is configured to abut a shoulder at an interface of the interior space and the bore.

14. The apparatus of claim 13, wherein the shoulder is the only shoulder in the interior space, such that the interior space comprises an unobstructed axial bore extending from the shoulder to an exterior of the body.

15. The apparatus of claim 1, wherein:
the retainer has an outer diameter that is larger than a diameter of the interior space and is configured to seat in a recess in the interior space, and
the clip comprises an e-clip and has an outer diameter that is smaller than the diameter of the interior space.

16. The apparatus of claim 1, wherein the sub-assembly further comprises a washer disposed on the pin between the retainer and the spring.

* * * * *